US007043331B2

(12) United States Patent
Sigtryggsson et al.

(10) Patent No.: US 7,043,331 B2
(45) Date of Patent: May 9, 2006

(54) METHOD OF MANUFACTURING A PLURALITY OF WOODEN PRODUCTS

(76) Inventors: Hallgrimur Sigtryggsson, 89 Mitchell St., Stamford, CT (US) 06902; Edwin O. Lindstrom, III, 42 Brightside Dr., Stamford, CT (US) 06902

( * ) Notice: Subject to any disclaimer, the term of this patent is extended or adjusted under 35 U.S.C. 154(b) by 0 days.

(21) Appl. No.: 10/830,257

(22) Filed: Apr. 22, 2004

(65) Prior Publication Data

US 2005/0240300 A1 Oct. 27, 2005

(51) Int. Cl.
*G06F 19/00* (2006.01)

(52) U.S. Cl. ...................... 700/184; 700/159; 700/180; 52/784.1

(58) Field of Classification Search ................ 700/131, 700/134, 135, 159, 160, 161, 171, 180, 184, 700/192; 52/784.1
See application file for complete search history.

(56) References Cited

U.S. PATENT DOCUMENTS

| | | | | |
|---|---|---|---|---|
| 4,327,615 | A | 5/1982 | Gerber et al. | |
| 4,466,069 | A | 8/1984 | Balfanz | |
| 4,964,321 | A | 10/1990 | Leiber et al. | |
| 5,088,181 | A | 2/1992 | Jeppsson | |
| 5,376,770 | A | 12/1994 | Kuhl et al. | |
| 5,391,968 | A * | 2/1995 | Niwa | 318/569 |
| 5,493,767 | A | 2/1996 | Susnjara | |
| 5,782,055 | A * | 7/1998 | Crittenden | 52/784.1 |
| 6,588,086 | B1 * | 7/2003 | Trybus | 29/557 |
| 2002/0072824 | A1 | 6/2002 | Susnjara | |
| 2002/0193905 | A1 * | 12/2002 | Davison et al. | 700/180 |
| 2003/0051333 | A1 | 3/2003 | Trybus | |
| 2003/0187624 | A1 | 10/2003 | Balic | |

OTHER PUBLICATIONS

CNC Router Technologies Web Page (www._Cncroutertech.com/services.htm, Apr. 19, 2004, 1-2).
CNC Router Technologies Web Page (www._Cncroutertech.com/default.htm, Apr. 19, 2004, 1).
CNC Router Technologies Web Page (www._Cncroutertech.com/faq.htm, Apr. 19, 2004, 1-2).
Woodweb Web Page (www.woodweb.com, Cost of Running a CNC Router, Apr. 19, 2004, 1-11).
SignWeb Web Page (www.signweb.com, An Up-Close Look at Sign Making Routers, Apr. 19, 2004, 1-3).
Virtual Systems (www.virtual-systems.com, ABC-Nest, Feb. 10, 2004, 1-2).
WoodWeb Web Page (www.woodweb.com, To Nest or Not to Nest, Feb. 10, 2004, 1-5).

(Continued)

*Primary Examiner*—Leo Picard
*Assistant Examiner*—Sheela S. Rao
(74) *Attorney, Agent, or Firm*—St. Onge Steward Johnston & Reens LLC

(57) ABSTRACT

A system and method for machining and cutting pieces from a sheet of material where the system machines or cuts the first side of the sheet material but does not sever the pieces from the sheet, and the entire sheet with the pieces still attached thereto is inverted and the system machines and cuts to opposite side of the pieces and finally severs the pieces from the sheet such that the pieces are essentially complete upon removal.

28 Claims, 10 Drawing Sheets

OTHER PUBLICATIONS

Timber and More Web Page (www.timberandmore.com, Software on Timber and More, Feb. 10, 2004, 1-3).
eCabinet Systems Web Page (www.ecabinetsystem.com, Frequently Asked Questions, Feb. 10, 2004, 1-9).
eCabinet Systems Web Page (www.ecabinetsystem.com, CabinetShop 40, Feb. 10, 2004, 1-4).
eCabinet Systems Web Page (www.ecabinetsystem.com, Software, Feb. 10, 2004, 1-3).
Techno Inc. Web Page (www.techno-isel.com, CNC Routers, Feb. 10, 2004, 1-6).
Techno Inc. Web Page (www.techno-isel.com, CNC Routers, Feb. 10, 2004, 1-3).

* cited by examiner

METHOD OF MANUFACTURING A PLURALITY OF WOODEN PRODUCTS

FIELD OF THE INVENTION

The system generally relates to CNC router equipment and processes for fabricating sheet components from a sheet of material.

BACKGROUND OF THE INVENTION

It is well-known in furniture and cabinet manufacturing facilities to utilize Computer Numerical Controlled (CNC) machines in the fabrication of components such as furniture and cabinets. The usual tool used in such operations is a CNC router. A CNC router includes a table having a vacuum or clamping system that holds a sheet down on the table by suction applied to the sheet through holes in the table. A cutting head is movable through at least three axes, and in some case five to six axes, to control the positioning of the cutting tool. The cutting head will typically have one cutting tool mounted in it which tool will be selected depending on the manufacturing operation desired. The cutting tools range in size and provide different edge contours as may be desired in the finished product.

To achieve maximum efficiency in the use of raw materials, programs have been developed to utilize as much of a sheet of material as possible, by laying out a number of components to be made from the sheet, a process which is known as "nesting." In the nesting process, the components are arranged so that when cut from a sheet of material there is as little scrap generated as is possible.

Once the particular sizes of various pieces are determined, a software program may be used to layout a cutting strategy for the sheet material such that the desired components may be cut from that sheet with a minimum of waste. The individual pieces are then cut out of the sheet. Each piece may then be further machined, for example, to add a decorative pattern to each piece.

A problem faced by these systems is that once the front of the sheet material is machined, each individual component is cut out of the sheet. In order to machine the rear face of each component, all of the components must be removed from the CNC router and then they must be individually repositioned so that a selected point is aligned with a zero axis point of the CNC router. The machine operator must input which component is being placed at the zero axis point so that the CNC machine will know the proper program to run for machining the back side of the piece. This is time consuming and labor intensive resulting in increased manufacturing costs. In addition, the method allows for operator error if the operator selects the wrong machining instructions for the component, resulting in wasted material.

What is desired then is a system that eliminates the need for placing individual cut pieces at a zero axis in order to machine the back side of the piece.

It is still further desired to provide a system that will minimize operator error in machining sheets of material with a CNC machine.

SUMMARY OF THE INVENTION

It is an object of the invention to provide a system and method that permits machining operations on both sides of a large sheet of material, to avoid the need for rear face machining of components on an individual basis.

This and other objects are achieved by providing a method of CNC routing that will cut a first and then a second side of a sheet of material. Nested pieces on the sheet material are not severed from the sheet when the first side is machined. After operations are completed on the first side of the sheet, the sheet is removed, inverted by flipping over and replaced in the CNC router so that the opposite sides may be machined or cut. The CNC router severs the individual pieces from the sheet when the opposite side is machined such that that may be individually removed in an essentially complete state.

To accomplish this, the system determines at least one set of coordinates corresponding to at least one piece nested in the sheet. The at least one set of coordinates is then transposed to what is essentially a mirror image of the original coordinates to control cutting or machining of the reverse side. In order for the transposed coordinates to accurately line up with the first side coordinates, the operator places a corner of the flipped sheet at a zero axis point of the CNC router table. The system may then accurately use the transposed coordinates for the reverse side.

In one advantageous embodiment a method of manufacturing a plurality of sheet components is provided comprising the steps of placing a sheet of material onto a table of a CNC router with a first side of the sheet of material facing a cutting tool of the CNC router, with a selected point on the sheet of material being positioned at a zero axis point of said CNC router, and cutting the first side of the sheet of material along an X, Y and Z axis of the sheet of material with the cutting tool to define one or more of a plurality of sheet components. The method further comprises the steps of removing the sheet of material from the table of the CNC router, inverting the sheet of material, and placing the inverted sheet material onto the table of the CNC router such that a second side of the sheet of material faces the cutting tool, the zero axis point being repositioned to be located at a location of the selected point on the inverted sheet of material. The method still further comprises the step of cutting the second side of the sheet of material along the X, Y and Z axis of the sheet of material with the cutting tool such that the plurality of sheet components are severed from the sheet of material.

In another advantageous embodiment a system for automatically cutting a sheet of material is provided comprising a table for receiving the sheet of material, and at least one cutting device for cutting the sheet of material. The system further comprises a controller for controlling the cutting device nesting plurality of sheet components on and for cutting both a first and a second side of the sheet of material and for controlling the cutting device along the X, Y and Z axis of the sheet of material. The system is still further provided such that both the first and second sides of the sheet of material are cut prior to any plurality of sheet components being separated from the sheet of material.

In still another advantageous embodiment a method of manufacturing a plurality of sheet components is provided comprising the steps of placing a sheet of material onto a table of a CNC router with a first side of the sheet of material facing a cutting tool of the CNC router, with a selected point on the sheet of material being positioned at a zero axis point of the CNC router, and cutting the first side of the sheet of material along an X, Y and Z axis of the sheet of material with the cutting tool to define a one or more of a plurality of sheet components. The method further comprises the steps of removing the sheet of material from the table of the CNC router, inverting the sheet of material, and placing the inverted sheet material onto the table of the CNC router such that a second side of the sheet of material faces the cutting tool, the zero axis point being repositioned to be located at a location of the selected point on the inverted sheet of material. The method still further comprises the steps of cutting the second side of the sheet of material along the X, Y and Z axis of the sheet of material with the cutting tool such that the plurality of sheet components are severed from the sheet of material during the second side cutting.

In another aspect of the invention, software for creating instructions for a CNC router to cut a plurality of sheet components from a sheet material is provided. The software provides a graphic display of the operations of a cutting tool on the sheet material to an operator prior to cutting of the sheet of material.

In still another advantageous embodiment a process of making a cabinet door is provided comprising the steps of placing a wooden sheet onto a table of a CNC router with a first side of the wooden sheet facing a cutting tool of said CNC router, with a selected point on said wooden sheet being positioned at a zero axis point of said CNC router, and cutting the first side of the sheet of material along an X, Y and Z axis of the wooden sheet with the cutting tool to define components of at least one cabinet door. The method further comprises the steps of removing the wooden sheet from the table of said CNC router, inverting the wooden sheet, and placing the inverted wooden sheet onto the table of the CNC router such that a second side of the sheet of material faces the cutting tool, the zero axis point being repositioned to be located at a location of the selected point on the inverted wooden sheet. The method still further comprises the step of cutting the second side of the wooden sheet along the X, Y and Z axis of the wooden sheet with the cutting tool such that the components of at least one cabinet door are severed from the sheet of material during the second side cutting.

The invention and its particular features and advantages will become more apparent form the following detailed description considered with reference to the accompanying drawings.

DETAILED DESCRIPTION OF THE DRAWINGS

Figure 1:
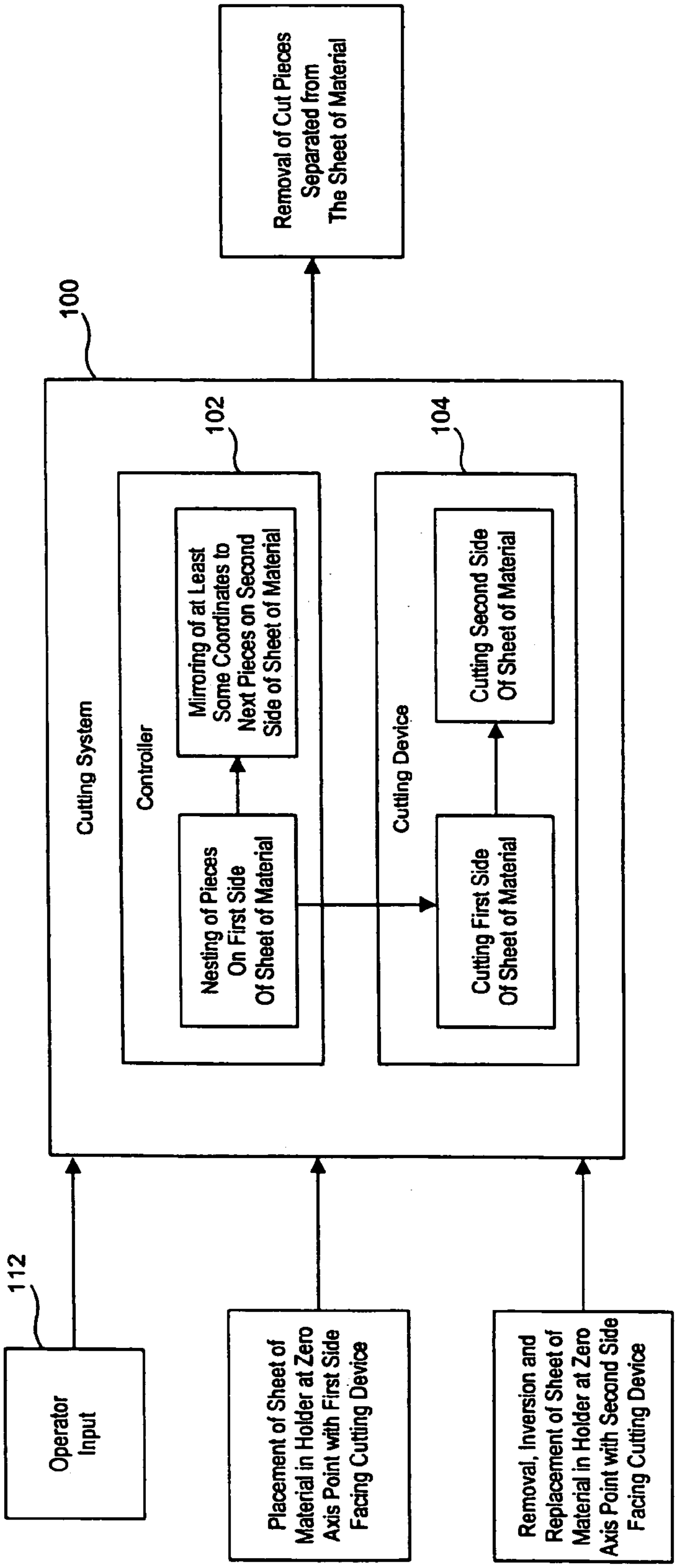
FIG. 1 is a block diagram of one advantageous embodiment of the invention.

Referring now to the drawings, wherein like reference numerals designate corresponding structure throughout the views.

Figure 2:
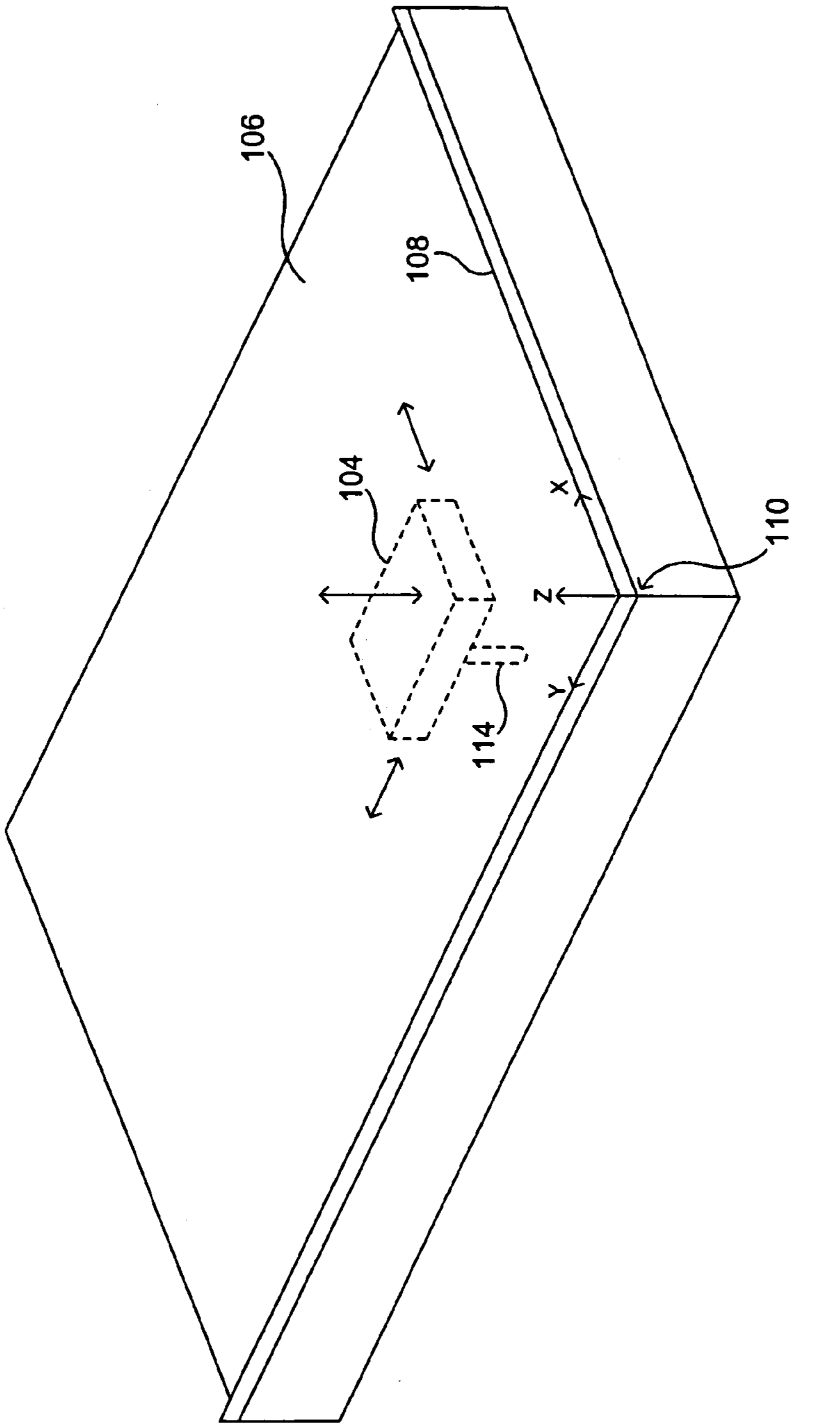
FIG. 2 is a perspective drawing of the cutting system illustrating the zero axis point.

Referring now to FIGS. 1–4, FIG. 1 is a block diagram illustrating cutting system 100 according to one advantageous embodiment of the present invention. Cutting system 100 includes controller 102 and cutting device 104 having for instance a cutting tool 114 (FIGS. 1 & 2). In one advantageous embodiment cutting system 100 comprises a CNC router. Cutting system 100 is designed to receive a sheet of material 10 (FIGS. 3 & 4) to be cut according to a selected input. The sheet of material 10 may comprise any type of material that may be cut into pieces and in one advantageous embodiment comprises for instance wood or a wood composite, chipboard, wood laminates, plastic, or plastic laminates.

Initially an operator (not shown) places a sheet of material in a holder 106 of cutting system 100. The holder 106 typically comprises a table of a CNC router which is a large flat surface with raised edges 108 for ease of alignment of the sheet of material 10 therein (FIG. 2). Holder 106 is also provided with a zero axis point 110 that corresponds to 0, 0, 0 in the X, Y and Z dimensions. Zero axis point 110 serves as the reference starting point for cutting system 100. The sheet of material 10 is placed with one corner aligned with zero axis point 110, which serves as the starting reference point for the sheet of material 10. Typically sheet of material 10 is simply placed in holder 106 and is securely held in place by means of a vacuum that draws and holds the sheet of material 10 against holder 106.

The operator (not shown) also provides various operator inputs 112 to cutting system 100. These operator inputs 112 may comprise information relating to the cutting of the sheet of material 10 such as for instance, the type and shape of the pieces to cut, the size of the pieces, any designs or decorative effects to cut into the surface of the pieces, or any other information related to the pieces to be cut. The operator (not shown) may manually input this information or may simply select pre-programmed designs from a list of cutting system programs or combinations thereof. It should further be noted that the operator may provide operator input 112 to cutting system 100 via a client workstation (not shown) which may comprise or include, for instance, a personal computer running the Microsoft Windows®. 95, 98, 2000, Millenium®, NT®, Windows CE®, Palm® OS, Unix®, Linux®, Solaris®, OS/2®, BeOS®, MacOS® or other operating system or platform. The client workstation (not shown) may also be or include any microprocessor-based machine such as an Intel® x86-based device or Motorola 68K or PowerPC device, microcontroller or other general or special purpose device operating under programmed control.

Still further, it is contemplated that the client workstation (not shown) may be located either adjacent to remotely located from cutting system 100 and connected to cutting system 100 via a communications link (not shown). The communications link (not shown) may be or include any one or more of, for instance, the Internet, an intranet, a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ATM (Asynchronous Transfer Mode) connection, FDDI (Fiber Distributed Data Interface) or CDDI (Copper Distributed Data Interface) connections.

Figure 3:
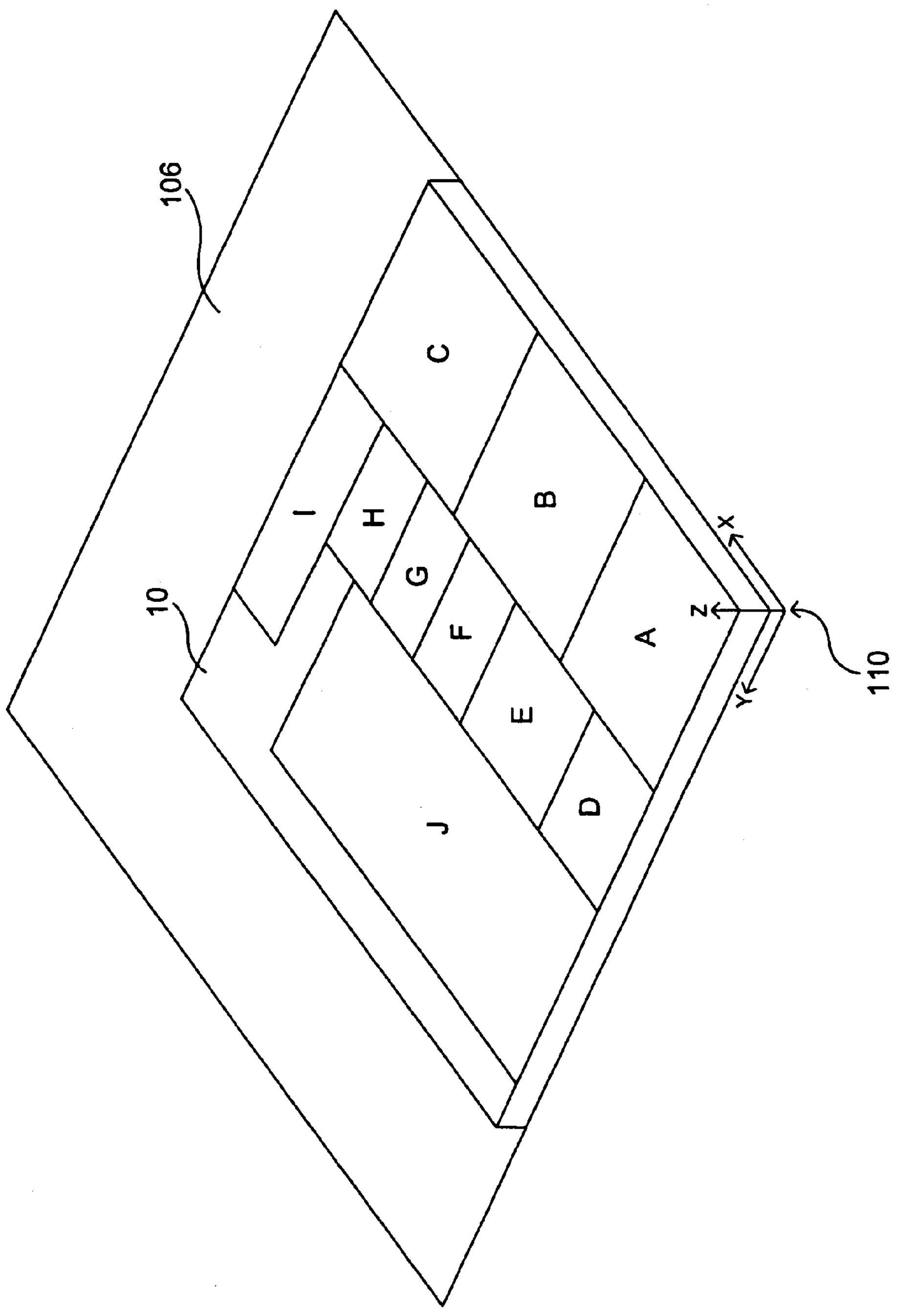
FIG. 3 is a perspective drawings according to FIG. 2 illustrating a sheet of material located on the table of a CNC router with one corner located the zero point axis and with various pieces nested on the sheet of material.

The operator or software may determine an optimal component layout on a sheet, requiring a nested series of manufacturing operations. FIG. 3 illustrates a potential plurality of sheet components "A" through "J" to be manufactured from the sheet of material 10. These pieces may correspond to any desired shape or size and may further include any design or pattern cut or machined into the front of the piece. It is contemplated that the operator (not shown) may be presented with a graphic image of what the individual pieces will look like after cutting. It is still further contemplated that the operator (not shown) may also adjust the cutting or machining of the pieces as desired prior to cutting.

Once the pieces are nested and the design or pattern is selected, the controller 102 controls cutting device 104 to cut the front side of the sheet material 10. The controller 102 uses the zero axis point 110 as a starting reference point to cut or machine the sheet of material 10 along selected coordinates. The controller 102 will control cutting device 104 along the X, Y and Z axis of the sheet of material 10 to generate the desired patterns and shapes for the pieces.

Notably, cutting device 104 does not sever the pieces from the sheet of material 10 when cutting the first side of the sheet. This allows the operator (not shown) to remove the entire sheet of material 10 at once and flip it over for replacement in holder 106. This is a very big advantage because it saves time in the manufacturing process where the operator does not have to gather up all the individual pieces and individually place them in holder 106 at zero axis point 110 for cutting or machining of the opposite side of the pieces. Another advantage of the system is that it eliminates operator error because the entire sheet is simply inverted and replaced. In known systems, each piece must individually be inverted and placed at the zero axis point 110. This has the definite potential of resulting in the placement of the wrong piece for cutting when multiple different pieces may be cut from the sheet of material 10

Figure 4:
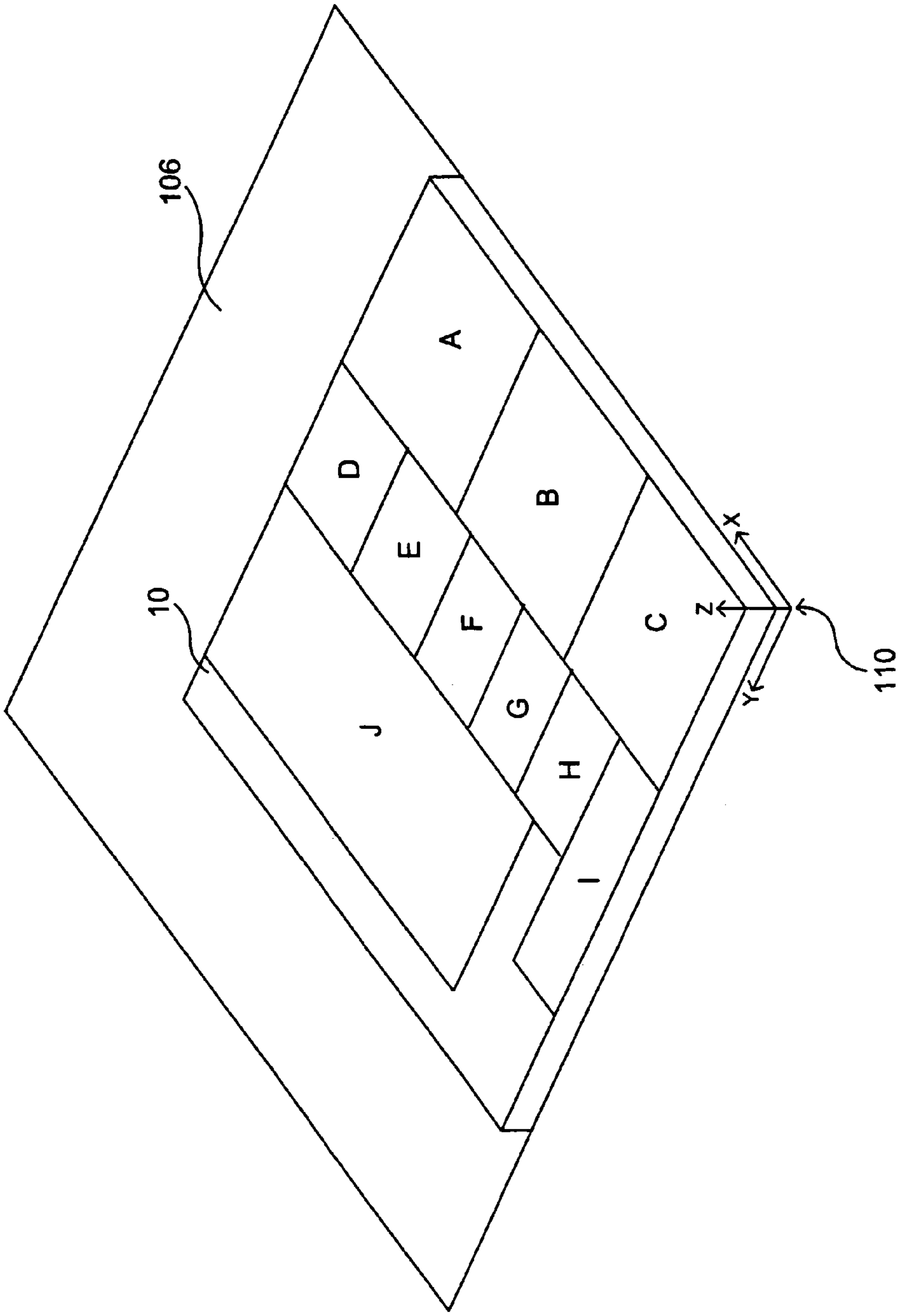
FIG. 4 is a perspective drawings according to FIG. 3 illustrating the sheet of material inverted and relocated on the table of a CNC router with one corner located a the zero point axis and with various pieces mirrored on the sheet of material.

These problems are eliminated by provision of simply inverting the entire sheet of material 10 with all the pieces "A" through "J" still attached thereto (FIG. 4). It is faster than individually processing each sheet component, and eliminates the need for the operator to select the correct piece to insert for machining.

Controller 102 will mirror the coordinates corresponding to pieces "A" through "J" for cutting or machining of the opposite sides of the pieces. Controller 102 then operates cutting device 104 to cut or machine the second side of the sheet of material 10 to machine any desired designs or patterns into the back sides of the pieces and further severs the individual pieces from the sheet of material 10 such that the operator may remove them from holder 106 in an essentially finished state.

Figure 5:
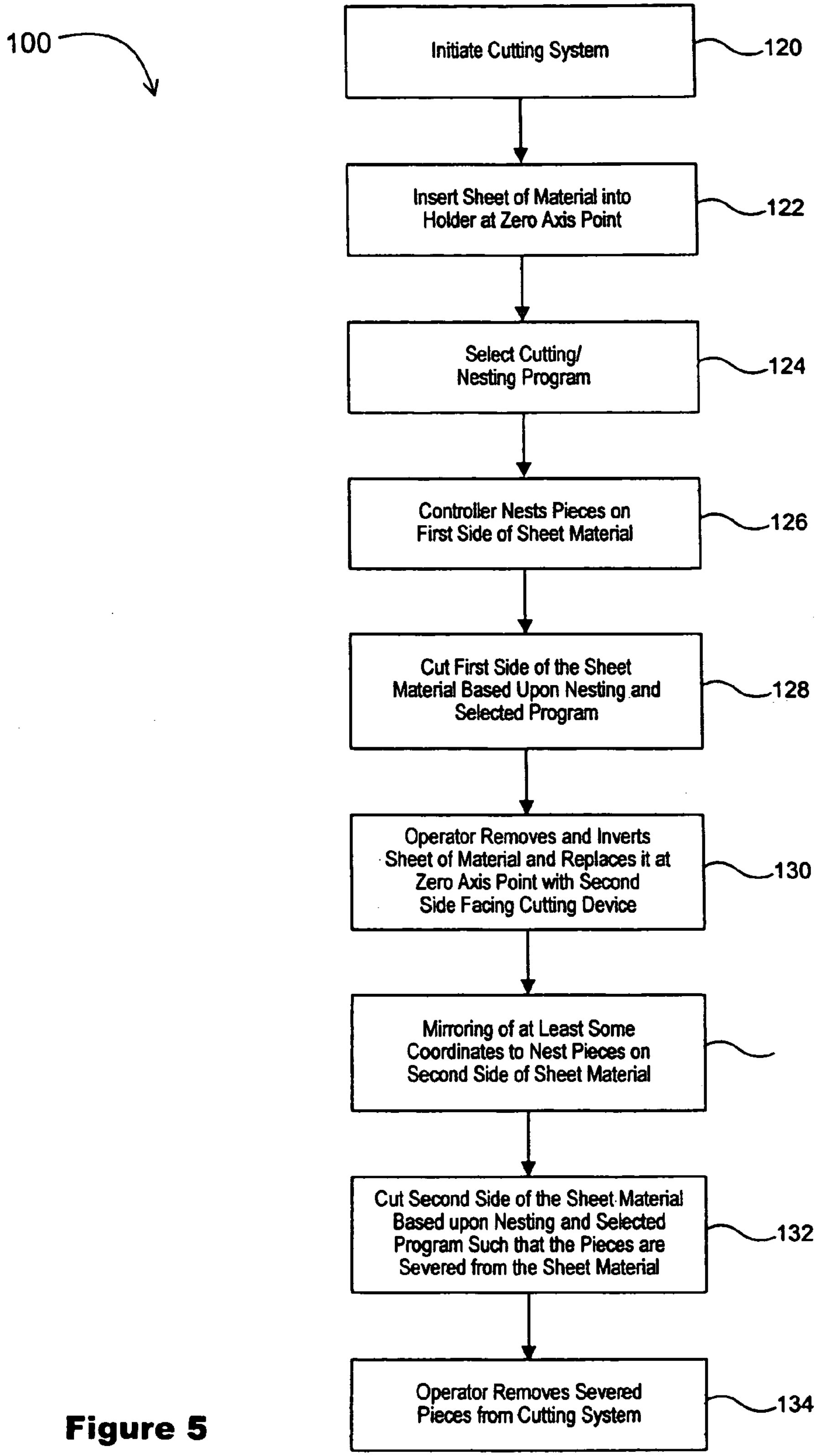
FIG. 5 is a flow diagram illustrating one advantageous embodiment of the present invention.

FIG. 5 is a flow diagram illustrating the steps taken by system 100 according to an advantageous embodiment of the present invention.

First the cutting system is initiated 120, which may include connecting to any workstations and/or databases and storages devices to access run programs. The operator inserts the sheet of material with the first side facing the cutting tool into the holder at the zero axis point 122.

The operator then may select the desired cutting pattern. As previously described, this may include simply selected a pre-programmed cutting solution or may comprise any custom cutting or machining desired or even combinations thereof. The operator may access lists of programs and visually look at a graphic depiction of each piece prior to cutting or machining and make any adjustment desired.

The controller then operates the cutting device to cut the first side of the sheet material based upon the cutting pattern provided by program 128. As previously explained, the cutting device does not sever the individual pieces from the sheet of material at this time. Rather, the cutting device provides all the desired cutting or machining to the first side of the sheet of material leaving the severing to a later step.

Once all of the cutting or machining is completed on the first side, the operator removes and inverts the sheet of material and replaces it at the zero axis point with the second side facing the cutting device 130. The controller then mirrors at least some of the coordinates corresponding to the pieces to nest the pieces on the second side of the sheet material 132. The controller then operates the cutting device to cut or machine the second side of the sheet material based upon the nesting and selected program such that the pieces are then severed from the sheet material 134. At this point the individual pieces are essentially complete and the operator removes the severed pieces from the cutting system 136 for assembly.

Figure 6:
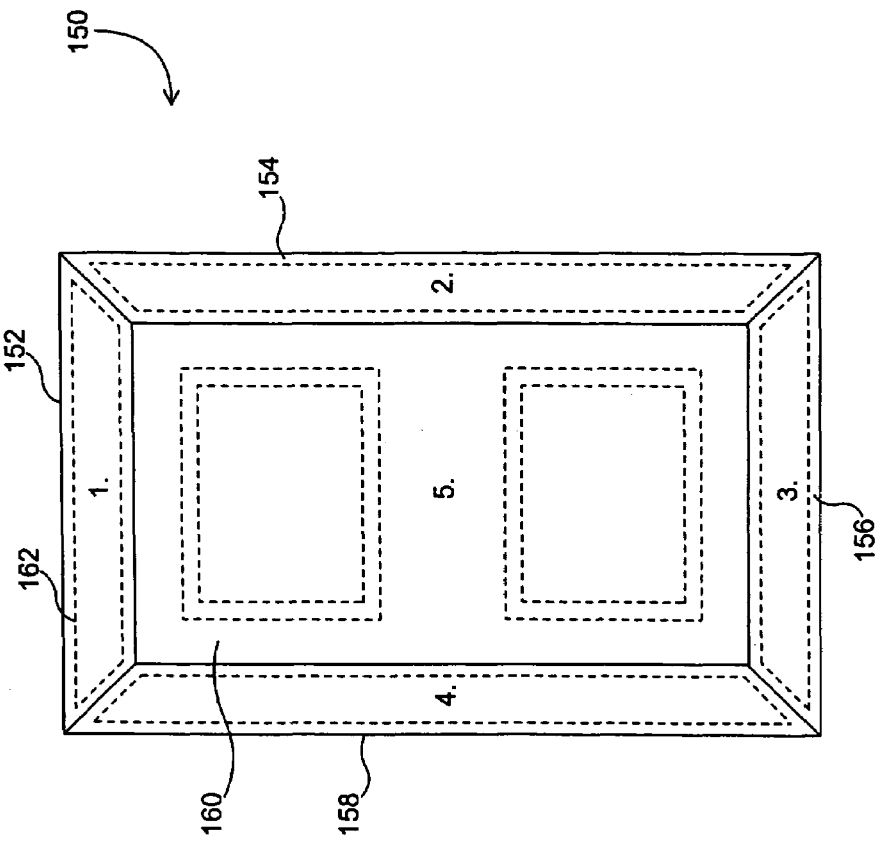
FIG. 6 is an illustration of a five-piece door manufactured according to an advantageous process of the present invention.

FIG. 6 is an example of one advantageous product made from the inventive process, which comprise a five-piece door 150. The five-piece door 150 is made up of an upper piece 152, two side pieces 154, 158, a lower piece 156 and a center piece 160, all of which may be assembled in a conventional manner. Further provided in five-piece door 150 are patterns or designs 162 illustrated in FIG. 6 as dashed lines. The patterns or designs 162 may comprise any type of decorative pattern or design desired. In addition, a reverse side (not shown) of five-piece door 150 may also be cut or machine according to a selected pattern or design, all of which is cut or machined by cutting system 100 from the sheet of material at one time.

Figure 7A:
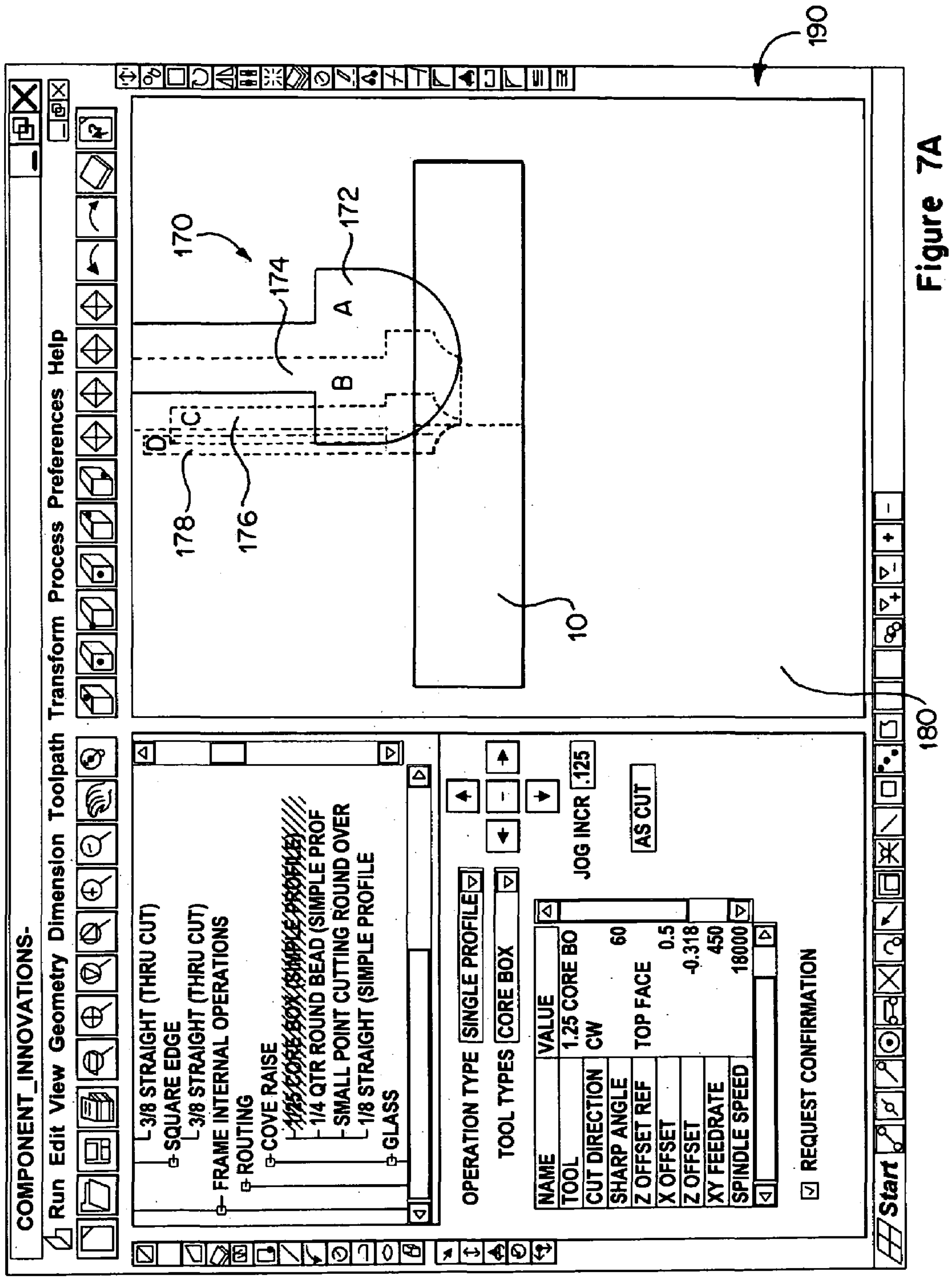
FIG. 7A is window of the graphic display of the operation of a cutting tool on the sheet material prior to cutting of the sheet of material.
Figure 7B:
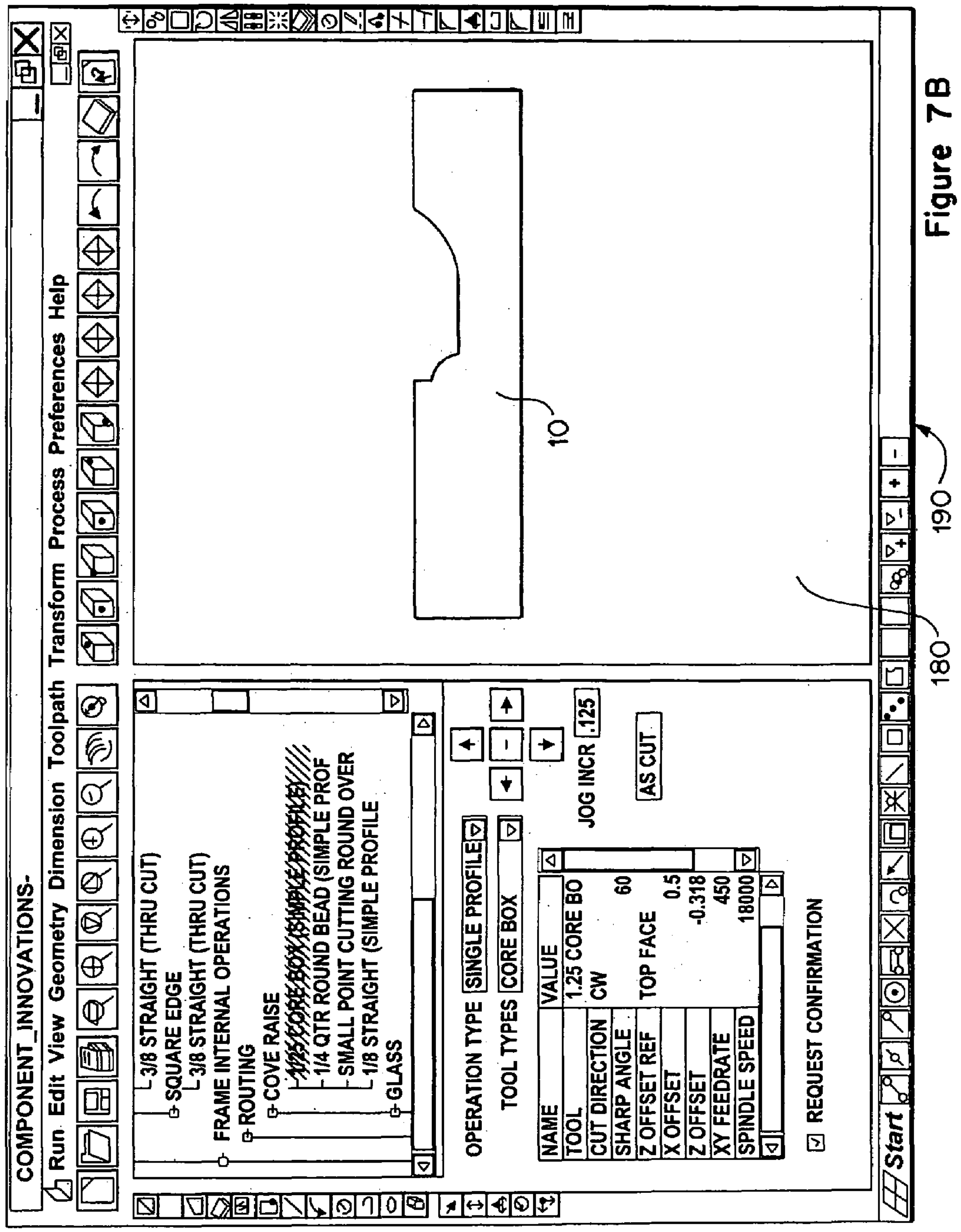
FIG. 7B is a window of the graphic display according to FIG. 7A illustrating the cutting effect of the selected tools on the sheet of material prior to cutting of the sheet of material.

The present invention includes software for creating instructions for a CNC router to cut a plurality of sheet components from a sheet material 10, which provides a graphic display 190 of the operations of at least one cutting tool 170, which may comprise various on the sheet material 10 to an operator prior to cutting of the sheet of material as illustrated in FIG. 7A. A display 180 of operations of a cutting tool includes display of a position of the tool(s) 170 relative to the sheet material 10 and the effect of such tool on the sheet material 10. For instance, as seen in FIG. 7A, cutting devices 172, 174, 176, 178 are all illustrated in hidden lines with a cross-sectional view of sheet of material 10 illustrating the cutting features of each device. The user may adjust each cutting device to for instance, cut deeper or shallower or to the left or right which would be illustrated on the graphic display 180 prior to cutting. In this manner the operator may make tool adjustments and visually see the cuts on the graphic display 180 without having to actually cut the sheet of material 10 leading to less waste, which is illustrated in FIG. 7B. Here sheet of material 10 is illustrated showing the cumulative cutting performed by cutting devices 172, 174, 176, 178 on graphic display 180.

Figure 8:
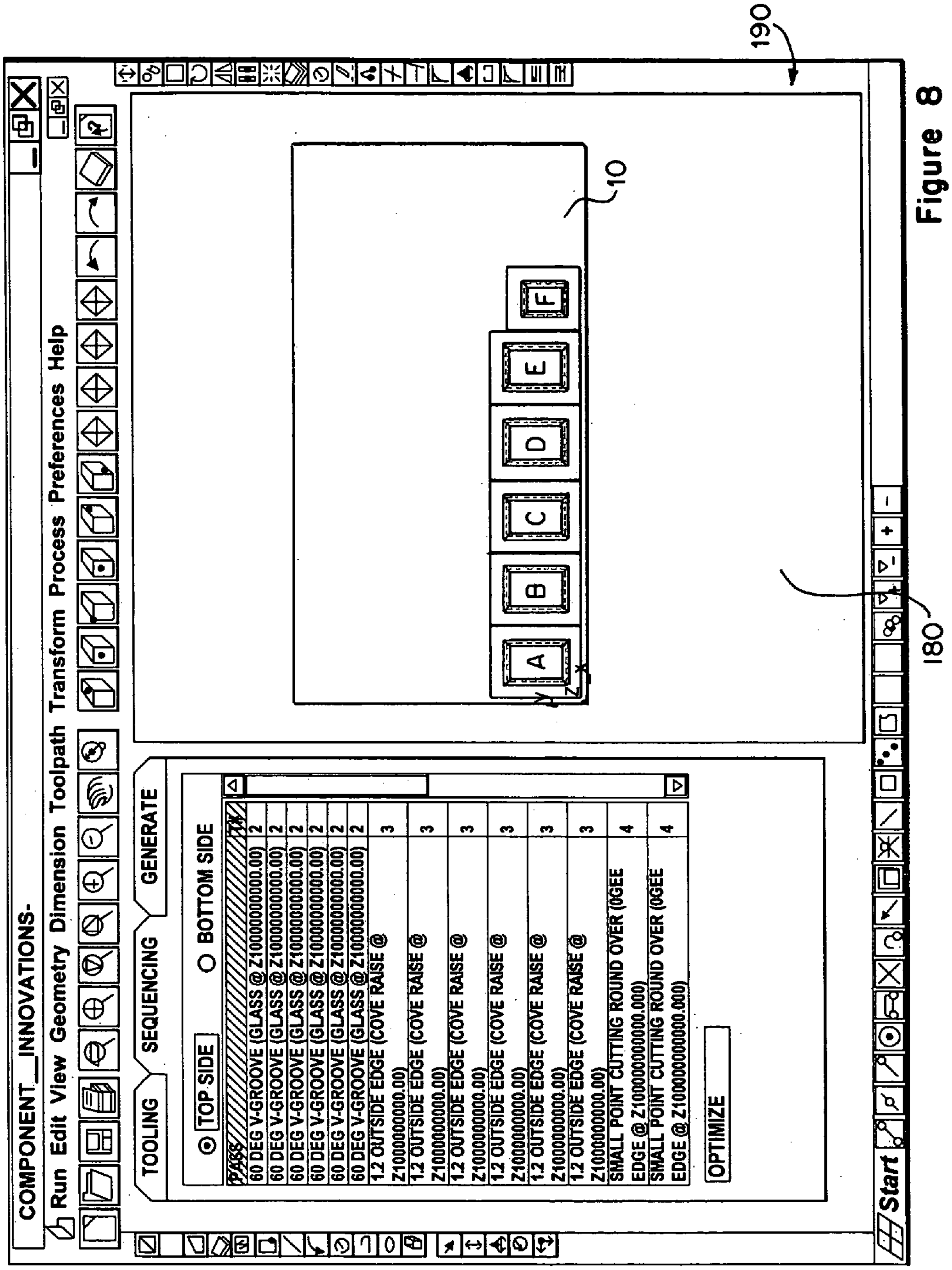
FIG. 8 is a window of the graphic display illustrating nesting of various components on the sheet of material.
Figure 9:
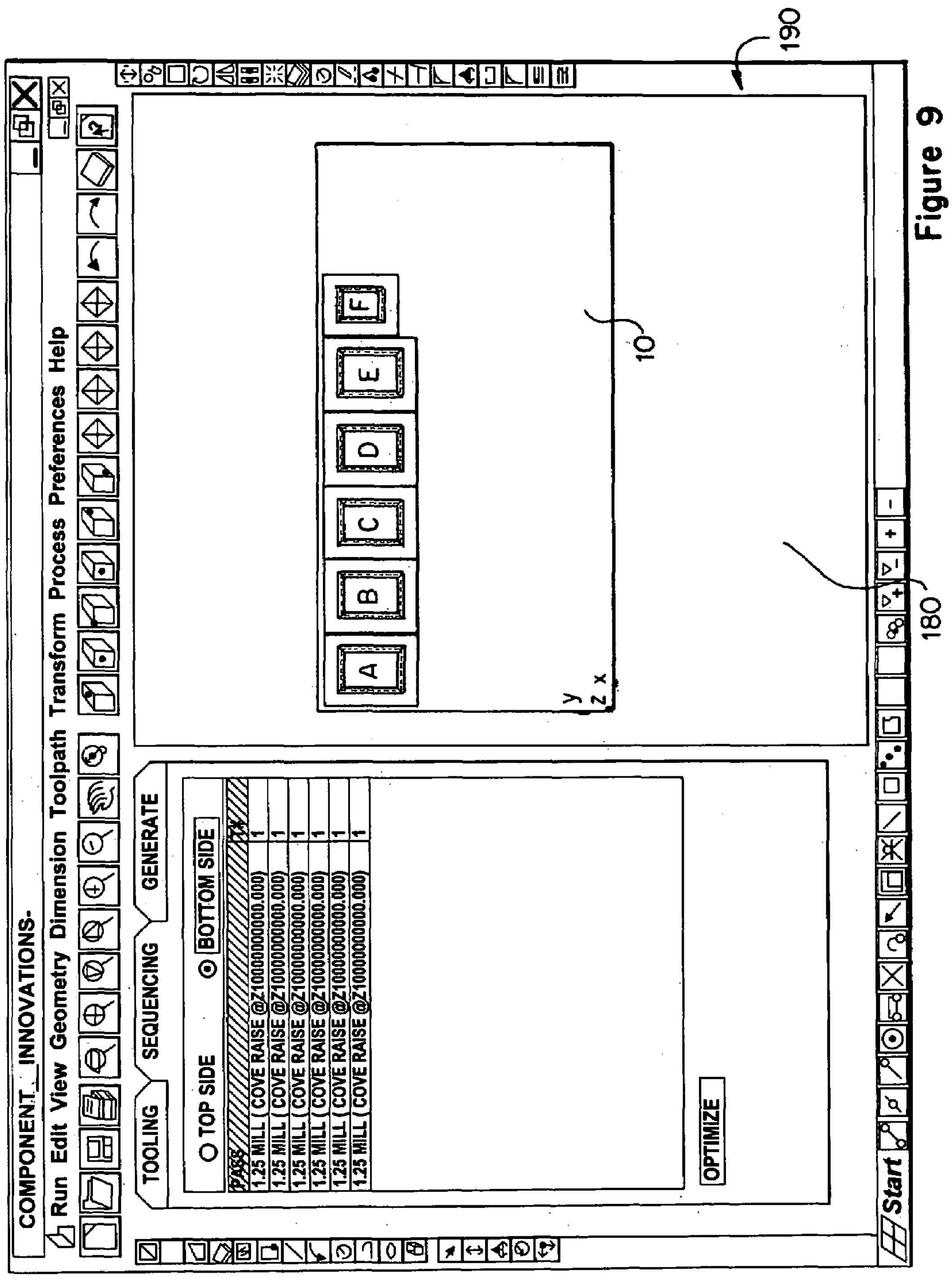
FIG. 9 is a window of the graphic display according to FIG. 8 illustrating nesting of various components on the sheet of material transposed.

FIGS. 8 and 9 provide a graphic display 180 of sheet of material 10 with pieces nested thereon. For instance, the operator may view sheet of material 10 on graphic display 180 having various sheet components such as "A" through "F" showing cutting on the first sides of the components, while FIG. 9 shows the same sheet components "A" through "F" transposed showing cutting of the second sides of the components. Graphic display 180 then provides the operator with power tools to plan and preview the cutting and/or machining operations prior to sheet of material 10 actually being cut. It is contemplated that a number of programs may be developed and saved for later use such that a less trained operator merely has to select and run a pre-programmed operation.

The inventive system then provides for lower manufacturing costs as the system can cut or machine pieces much quicker than conventional machines and results in fewer operator mistakes which also lowers costs associated with manufacture. It is further contemplated that less training will be required by the operator as his function may be limited to simply loading, inverting and removing the finished pieces and would not have to insert the correct pieces for the program to be run. This again may result in cost savings as less skilled and therefore less expensive operators may be used to run cutting system 100.

Although the invention has been described with reference to particular ingredients and formulations and the like, these are not intended to exhaust all possible arrangements or features, and indeed many other modifications and variations will be ascertainable to those of skill in the art.

What is claimed is:

1. A method of automatically cutting a sheet of material comprising the steps of:

inserting a sheet of material onto a holder at a zero axis point with a first side of the sheet of material facing a cutting tool;

nesting pieces on both the first and a second side of the sheet of material;

cutting the first side of the sheet of material along an X, Y and Z axis of the sheet of material with the cutting tool;

removing, inverting and re-inserting the sheet of material onto the holder at the zero point with the second side facing the cutting tool; and cutting the second side of the sheet of material along the X, Y and Z axis of the sheet of material with the cutting tool such that the nested pieces are severed from the sheet of material.

2. The method according to claim 1 wherein the sheet of material comprises wood.

3. The method according to claim 1 wherein the pieces cut from the sheet of material comprise pieces for a five piece door.

4. The method according to claim 1 wherein a controller controls the cutting of the sheet of material.

5. The method according to claim 4 wherein said controller uses at least one set of coordinates to cut the first side of the sheet of material.

6. The method according to claim 5 wherein said controller mirrors the at least one set of coordinates to cut the second side of the sheet of material.

7. The method according to claim 4 wherein said controller uses at least one set of coordinates to nest a piece on the first side of the sheet of material and mirrors the at least one set of coordinates to nest the piece on the second side of the sheet of material.

8. The method according to claim 4 wherein said controller uses multiple sets of coordinates to define pieces and to cut patterns into the pieces on the first side of the sheet of material.

9. The method according to claim 8 wherein said controller mirrors at least some of the coordinates to define pieces and to cut patterns into the pieces on the second side of the sheet of material and to sever the pieces from the sheet of material.

10. The method according to claim 1 wherein a tool is used to cut the sheet of material.

11. The method according to claim 1 wherein multiple tools are used to cut the sheet of material.

12. The method according to claim 10 wherein the order in which the multiple tools are used to cut the sheet of material is selectable.

13. The method according to claim 1 further comprising the step of providing a graphic feed back to an operator prior to cutting of the sheet of material.

14. A system for automatically cutting a sheet of material comprising:

a holder having a zero axis point for receiving the sheet of material;

at least one cutting device for cutting the sheet of material;

a controller for nesting pieces on and for cutting both a first and a second side of the sheet of material for severing the nested pieces from the sheet of material and for controlling the cutting device along the X, Y and Z axis of the sheet of material; and wherein both the first and second sides of the sheet of material are cut prior to any nested pieces being separated from the sheet of material.

15. The system according to claim 14 wherein the sheet of material comprises wood.

16. The system according to claim 14 wherein the pieces cut from the sheet of material comprise pieces for a five piece door.

17. A five piece door made by the process of:

inserting a sheet of material onto a holder at a zero axis point with a first side of the sheet of material facing a cutting tool;

nesting pieces on both the first and a second side of the sheet of material;

cutting the first side of the sheet of material along an X, Y and Z axis of the sheet of material with the cutting tool;

removing, inverting and re-inserting the sheet of material onto the holder at the zero point with the second side facing the cutting tool;

cutting the second side of the sheet of material along the X, Y and Z axis of the sheet of material with the cutting tool such that the nested pieces are severed from the sheet of material; and assembling the pieces into a five piece door.

18. The method according to claim 17 wherein the sheet of material comprises wood, wood laminates, chipboard, plastic, or plastic laminates.

19. The method according to claim 18 wherein the sheet of material comprises wood and the plurality of sheet components cut from the sheet of material include pieces for a five piece door.

20. The method according to claim 18 wherein said CNC router uses a first set of coordinates to cut the first side of the sheet of material and a second set of coordinates which are a transposition of the first set of coordinates to cut the second side of the sheet of material.

21. The method according to claim 17 further comprising the step of providing a graphic display of the operations of the cutting tool on the sheet material to an operator prior to cutting of the sheet of material.

22. Software for creating instructions for a CNC router to cut a plurality of sheet components from a sheet material for assembly, said software providing a graphic display of the operations of a cutting tool on the sheet material to an operator prior to cutting of the sheet of material.

23. Software in accordance with claim 22, wherein said display of the operations of a cutting tool includes display of a position of said tool and the effect of such tool on the sheet material.

24. Software in accordance with claim 22, wherein said cutting tool comprises a plurality of cutting devices.

25. Software in accordance with claim 24, wherein said graphic display shows the operation of each of the plurality of cutting devices.

26. Software in accordance with claim 25, wherein upon adjustment of each of the plurality of cutting devices, said graphic display shows the adjusted operation of each of the plurality of cutting devices.

27. Software in accordance with claim 24, wherein the cutting devices may be selected from a list of cutting devices.

28. The process of making a cabinet door, comprising the steps of:

placing a wooden sheet onto a table of a CNC router with a first side of the wooden sheet facing a cutting tool of said CNC router, with a selected point on said wooden sheet being positioned at a zero axis point of said CNC router;

cutting the first side of the sheet of material along an X, Y and Z axis of the wooden sheet with the cutting tool to define components of at least one cabinet door;

removing said wooden sheet from said table of said CNC router;

inverting said wooden sheet;

placing the inverted wooden sheet onto said table of said CNC router such that a second side of said sheet of material faces said cutting tool;

said zero axis point being repositioned to be located at a location of said selected point on said inverted wooden sheet; and cutting the second side of the wooden sheet along the X, Y and Z axis of the wooden sheet with the cutting tool such that said components of at least one cabinet door are severed from the sheet of material during said second side cutting.

* * * * *